US008711095B2

(12) United States Patent
Tan et al.

(10) Patent No.: US 8,711,095 B2
(45) Date of Patent: Apr. 29, 2014

(54) PROGRAMMABLE COMPUTER MOUSE

(76) Inventors: Min-Liang Tan, Singapore (SG); Chern Ann Ng, Singapore (SG)

( * ) Notice: Subject to any disclaimer, the term of this patent is extended or adjusted under 35 U.S.C. 154(b) by 1406 days.

(21) Appl. No.: 11/883,910

(22) PCT Filed: Jun. 4, 2005

(86) PCT No.: PCT/US2005/011417
§ 371 (c)(1),
(2), (4) Date: Oct. 3, 2007

(87) PCT Pub. No.: WO2006/107296
PCT Pub. Date: Oct. 12, 2006

(65) Prior Publication Data
US 2011/0084904 A1 Apr. 14, 2011

(51) Int. Cl.
*G09G 5/08* (2006.01)
(52) U.S. Cl.
USPC .......................................... 345/163; 345/172
(58) Field of Classification Search
CPC ........................... G06F 3/0238; G06F 3/03543
USPC ........................................ 345/156–169, 172
See application file for complete search history.

(56) References Cited

U.S. PATENT DOCUMENTS

| 6,018,335 | A  | * | 1/2000 | Onley et al. | 345/172 |
| 6,992,656 | B2 | * | 1/2006 | Hughes | 345/163 |
| 7,424,306 | B2 | * | 9/2008 | Eichenbaum | 345/168 |
| 2004/0222963 | A1 | * | 11/2004 | Guo et al. | 345/156 |
| 2005/0057517 | A1 | * | 3/2005 | Rix | 345/168 |

* cited by examiner

*Primary Examiner* — Regina Liang
(74) *Attorney, Agent, or Firm* — Andrew G. DiNovo; DiNovo Price Ellwanger & Hardy LLP

(57) ABSTRACT

System and method are disclosed for programming a user input device such as a computer mouse or computer keyboard. The user input device features memory for storing programming information associated with various user inputs, such as buttons or keys. The user may define macros, shortcuts, programs and other functions associated with any or all of user profiles so that the user may switch between various programmed data sets with ease.

22 Claims, 9 Drawing Sheets

PROGRAMMABLE COMPUTER MOUSE

BACKGROUND OF THE INVENTION

1. Field of the Invention

The present invention relates generally to the field of computer peripherals, and more particularly to programmable user input devices such as the computer mouse.

2. Description of the Related Art

Computer input devices, such as the computer mouse, joysticks, rumblepads, keyboards, keypads and the like, are essentially required for a human to interact with a computing device and consequently have been a cornerstone of the computer industry. Generally, the popularity of such devices among certain market segments, such as those playing computer games or simulations, may be different and have heightened requirements. To many such users, suitability of the device in question depends on the perceived overall feel, sensitivity, accuracy, flexibility and ease of use. As games and other software applications become increasingly complex, more options for user input are required.

As a consequence of the need for greater options for user input, a trend has emerged in which computer input devices such as the computer mouse have been designed with an increasing number of buttons, scroll pads, and other triggers and controls. While this approach has addressed some of the need for greater options and user control, there has emerged a need for yet more flexibility, user control, and potential for simplification.

Accordingly, what is needed is a computer peripheral that is capable of providing increased options, flexibility and control. More specifically, what is needed is a user input device that is programmable to allow the user to define the use and consequent user input of various input features (e.g., buttons, keys, sliders, and the like) on the peripheral.

SUMMARY OF THE INVENTION

An improved user input device is disclosed wherein the devise contains persistent memory and is programmable to allow the entry of various special instructions which may be customized by the user Such instructions may comprise macros that facilitate user input by allowing relatively complex input by the mouse to be made with one or more button depressions or other device manipulations. This programming information may then he saved on an electronically readable medium such as a non-volatile memory associated with the device.

In one aspect, the user has the potential to create user profiles for different users or software applications for which a different set of stored instructions corresponding to device input may be desired.

The above summary of the present invention is not intended to represent each embodiment, or every aspect, of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings, wherein.

Figure 1:
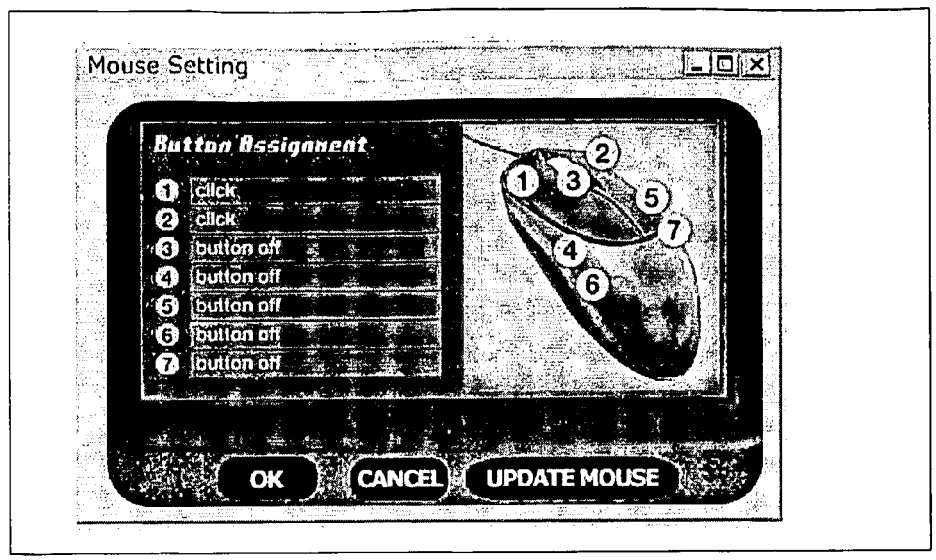
FIG. 1 illustrates a perspective view of a programmable mouse with various user-inputs according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

Following is a detailed description of the invention with reference to the drawings wherein reference numerals for the same or similar elements are carried forward.

As alluded to above, embodiments of the invention provide a system and method of enhancing flexibility and control of a user input device by allowing programming of the device. For purposes of ease of discussion, the device will be often referred to herein as a computer mouse. A person of ordinary skill in the art, however, will understand the applicability of the present invention to other types of user input devices.

The present invention relates to modifying any programmable input device peripheral, including computer mice, computer keyboards and computer gamepads, by including nonvolatile memory such as an electrically erasable programmable read only memory (EEPROM) on the input device to enable a user of the said programmable input device peripheral to define and/or program selected buttons or keys of the said input device peripheral to other buttons or keys or to denote a series of buttons or keys, often referred to as a macro.

Programmable input device peripherals are generally available today for computer systems and such peripherals include by way of example programmable mice, keyboards and gamepads. In a preferred embodiment, such programmable input device peripherals can be programmed by way of a software program that assigns a specific button, key, macro or function to a specific button or key on the programmable device. By doing so, the user can customize the input device to perform in accordance to his preferences wherein the buttons and/or keys are programmed to keystrokes that the user has defined. This can enhance the productivity and efficiency of the user when using the computer system for work or entertainment.

Heretofore, such programming functions have been generally limited to software solutions residing on the computer system, which will require the user to load a specific software driver or application on the computer system before the said input device peripheral can be programmed.

The present invention allows a user to program an input device peripheral such as a computer mouse, keyboard or gamepad to program specific keystrokes or series of keystrokes, also known as macros, to correspond with specific buttons or keys on the input device peripheral. This is achieved by building a microcontroller and providing memory onboard the user input device.

When the user executes a specific keystroke and/or keystroke procedure, the microcontroller automatically switches from the standard mode to a programmable mode. The user will then select a specific button or key on the input device peripheral which will be defined as the master key, and then enter another key or macro, to associate the said key or macro with the master key. The user can then enter a specific keystroke and/or keystroke procedure to switch the microcontroller from programmable mode to standard mode, wherein the said master key would be programmed to be associated with the key or macro entered during the programmable mode. Each programmed key or macro may be a specific key, files, commands, or series of the foregoing. Once the master key has been programmed, each time the user presses the master key, the input device would automatically provide the output associated with the programmed keys or macros.

This method of programming the input device requires a predefined sequence for the input device peripheral to exit the standard mode and enter into the programmable mode as well as a corresponding predefined sequence to exit the programmable mode and enter the standard mode. Using this method, the user is not required to access a graphical user interface to program the user input device, as programming can be accomplished simply by depressing the programming keys and key inputs.

Alternatively, the input device peripheral can also be programmed by way of a software application wherein the user can opt to program keystrokes or macros to selected keys.

As the programmed keystrokes or macros can be stored on the electrically erasable programmable read only memory (EEPROM) which is onboard the said input device peripheral, the said programmed keystrokes, macros and functions will then be resident on the input device peripheral and not dependent on any software application. Accordingly, when the input device peripheral is moved from one computer system to another computer system, the input device peripheral retains the programmed keystrokes, macros and functions without the need for the user to seek to program the input device peripheral again.

In an alternative embodiment, the nonvolatile memory may be modular and removable from the user input device. In this way, for example, the memory module could be inserted into a different user input device (e.g., mouse) and the user-defined profiles could be accessed without the need for separately programming the device.

Further, as the user may prefer to have different profiles for the programmed keys or buttons, the input device peripheral may be able to store different sets of programmed keys in specific profiles. Such profiles may be set for the input device peripherals by way of a predefined sequence for the keys or buttons to exit one profile to the next profile. Alternatively, the input device peripheral may also change from one profile to another by way of a software application.

FIG. 1 shows a computer mouse with user inputs 1-7. Each of these user inputs may be individually programmed according to the present invention. This programming may be accomplished is several ways, including through software associated with the mouse driver and through special programming hardware features that may be included with the mouse to facilitate programming, as discussed herein.

Figure 2:
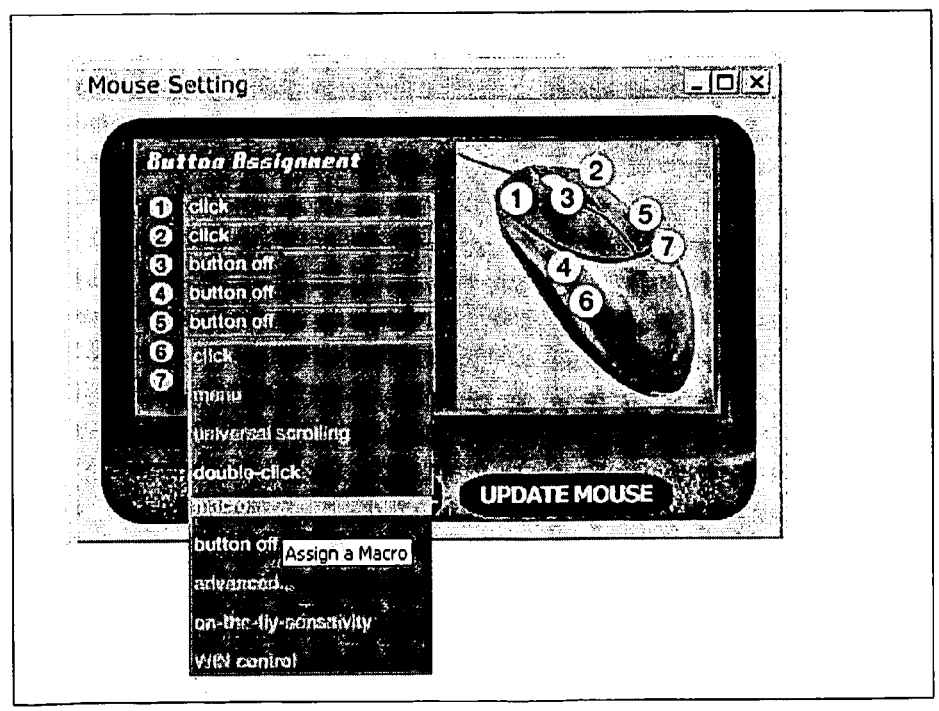
FIG. 2 illustrates a drop down menu that may be used to assign a function to a user input according to one aspect of the present invention.

FIG. 2 shows an embodiment of the present invention wherein computer software is used to program a macro or input function associated with a keyed user input. The software display lists seven button assignments corresponding to the seven user inputs 1-7. In FIG. 2, the user selects one such user input 6, and from a drop down menu selects from a variety of possible programming options. Such programming options include universal scrolling, double-click, a customizable macro, button off, and other features.

Figure 3:
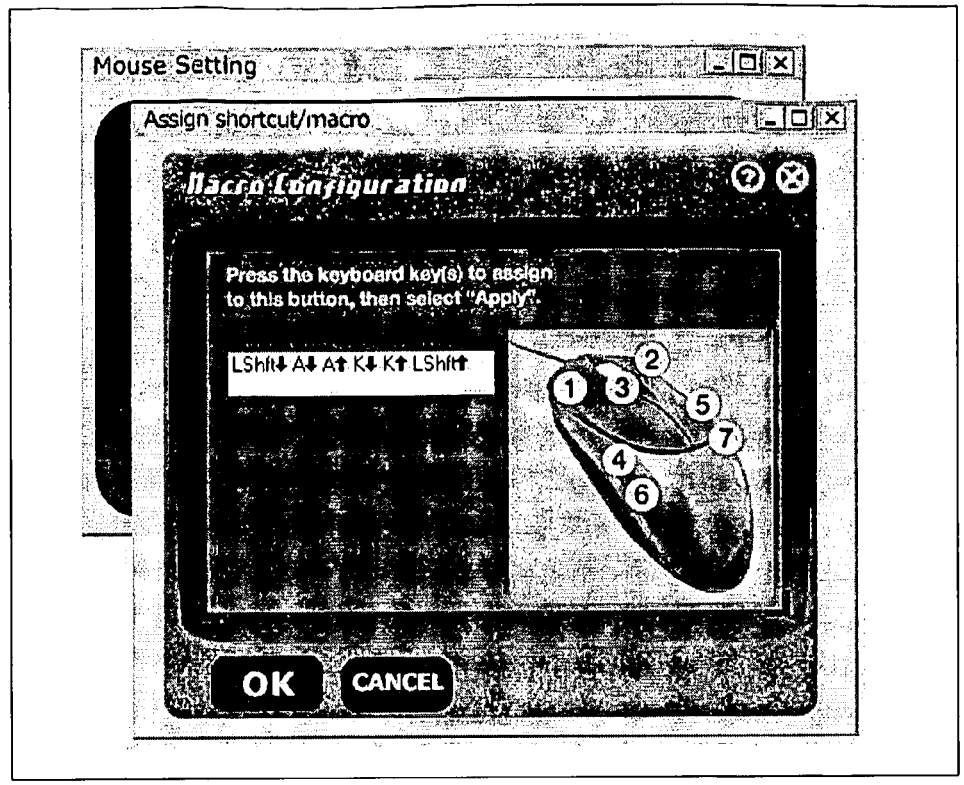
FIG. 3 illustrates an exemplary function or macro that may be assigned to a user input according to one aspect of the present invention.

If the user selects the macro option, a new dialog box may appear that will capture any subsequent key-presses, which can either be in the form of a specific key, or a series of keys. The user may thus establish a user-defined macro associated with the selected user input 6. This macro may correspond to a relatively complex series of keystrokes. Shown in FIG. 3 is the user-defined macro LShft↓A↓A↑K↓K↑LShft↑. By programming user input 6 in this fashion, the user may thus substantially reduce the complexity of the required keystrokes or user input while providing the desired data input to the computing device. After the user has identified the desired macro, the user may confirm his or her selection with a confirmation, such as by clicking "OK."

Figure 4:
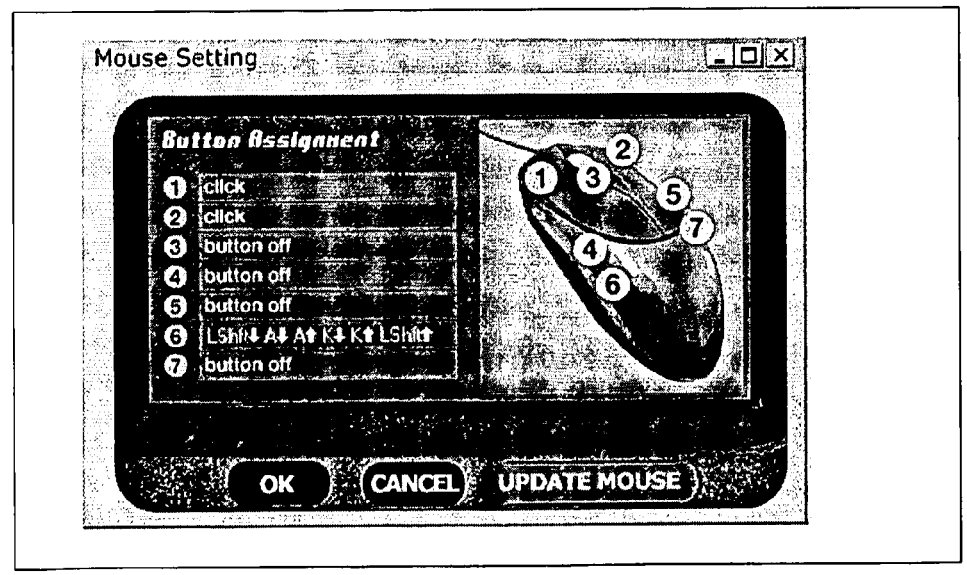
FIG. 4 illustrates an exemplary method of storing in the mouse hardware a macro assignment to a user input according to one aspect of the present invention.

As shown in FIG. 4, once the user is satisfied with his or her programming choices for any or all of user inputs 1-7, the user may indicate that the mouse hardware settings should be updated. In the exemplary embodiment shown in FIG. 4, this is accomplished by the user's indication on the "UPDATE MOUSE" selection.

Figure 5:
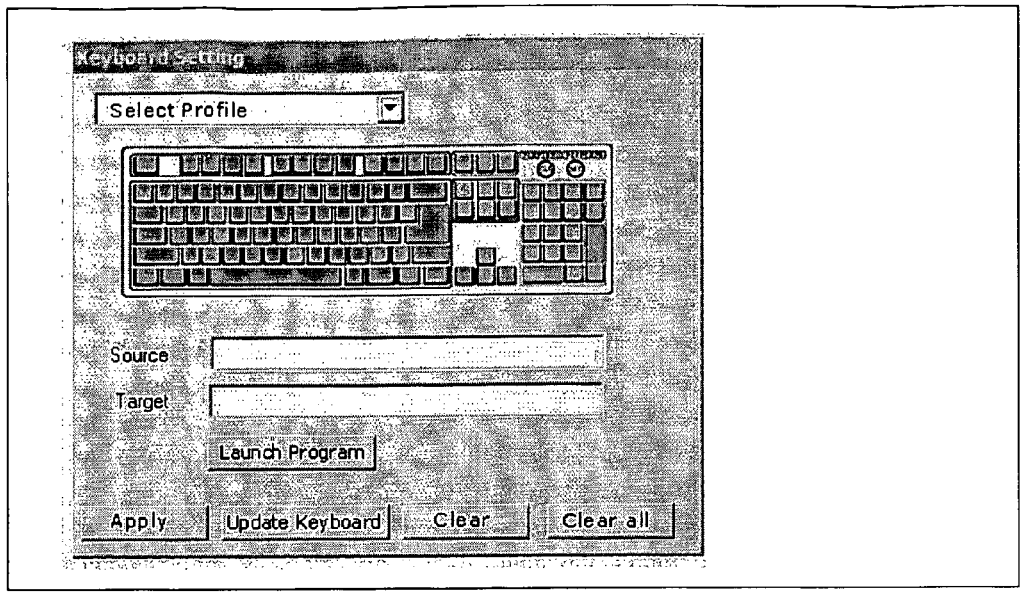
FIG. 5 illustrates an exemplary software window for programming a computer keyboard according to one aspect of the invention.

The present invention also contemplates the programming of keys on keyboards, keypads and the like. FIG. 5 depicts a software screen facilitating the programming of macros or user-defined functions for keys. The software allows access to a fixed list of profiles each potentially containing its own set of shortcuts and/or macros.

Figure 6:
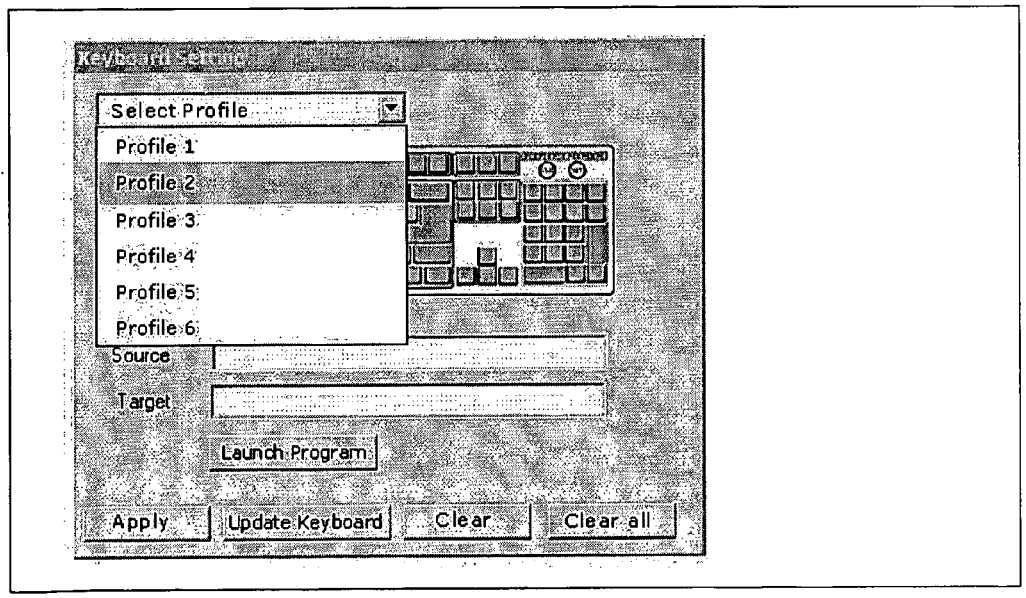
FIG. 6 shows drop down menus allowing the selection of various profiles so that different user profiles may be established and selected.
Figure 7:
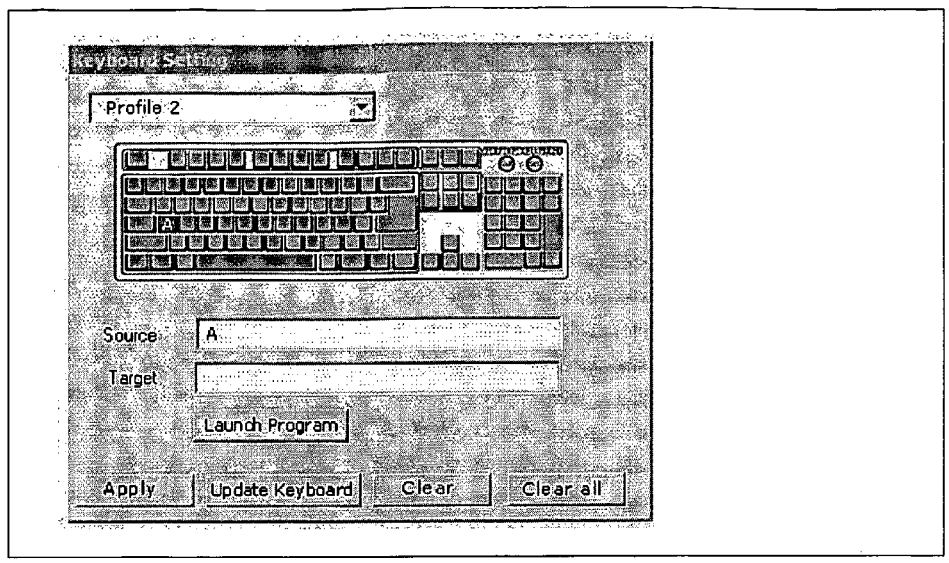
FIG. 7 illustrates the identification of a source key for which a macro will be programmed for the selected profile.
Figure 8:
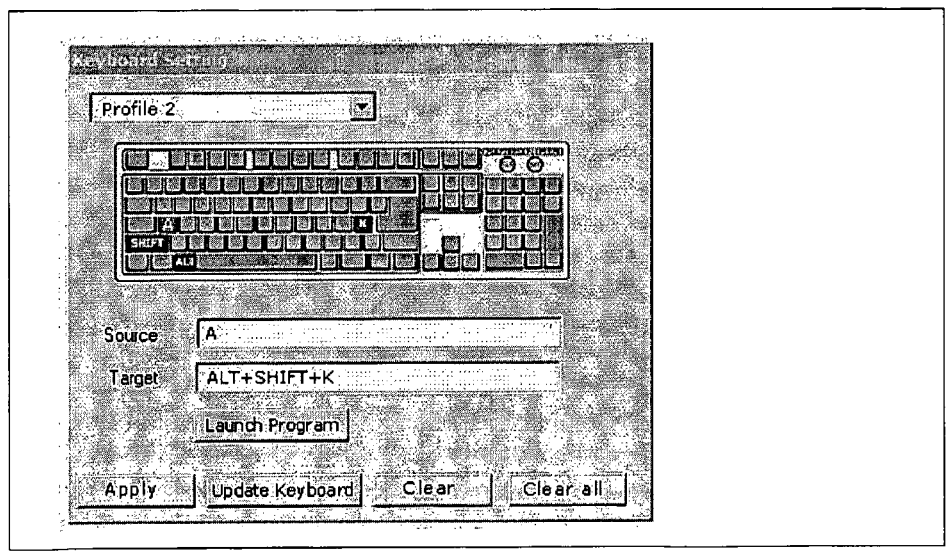
FIG. 8 illustrates the identification of a target macro associated with the source key of FIG. 7 and which will be programmed for the selected profile.

Before programming of additional keys or clearing of previous profiles from the keyboard, a desired profile can be loaded for manipulation, as shown in FIG. 6, in which Profile 2 has been selected. Then the user may select the "source key"

with respect to which he or she desires to program a macro or short cut. In FIG. 7, "A" is being selected as the source key. Next, the user defines the target macro or shortcut to associate with that source key. FIG. 8 shows "ALT+SHIFT+K" being selected as the target. These settings can then be saved by the driver application under Profile 2, such as by striking the "Apply" key. When the user has finished and wishes to save the updated programming information to the keyboard hardware, such as EEPROM, the user depresses the "Update Keyboard" button.

Figure 9:
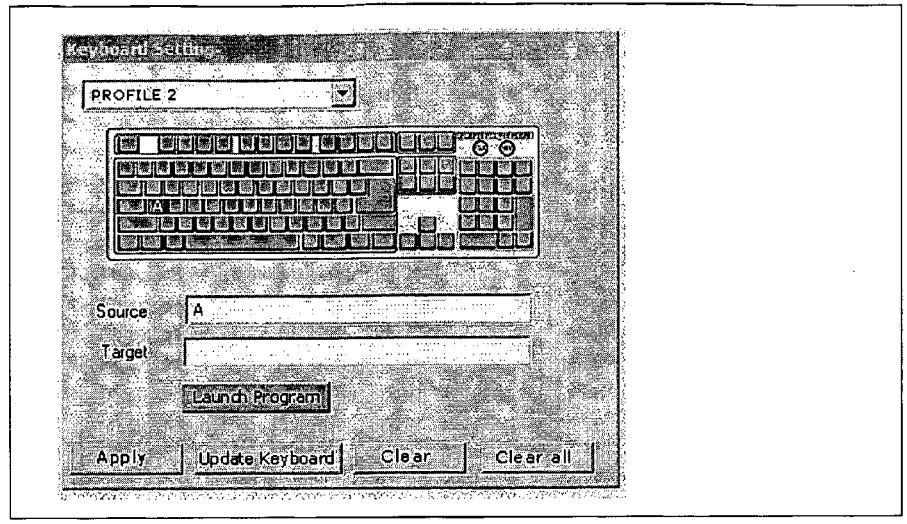
FIG. 9 illustrates how a source key can be associated with launching a program in accordance with one embodiment of the present invention.
Figure 10:
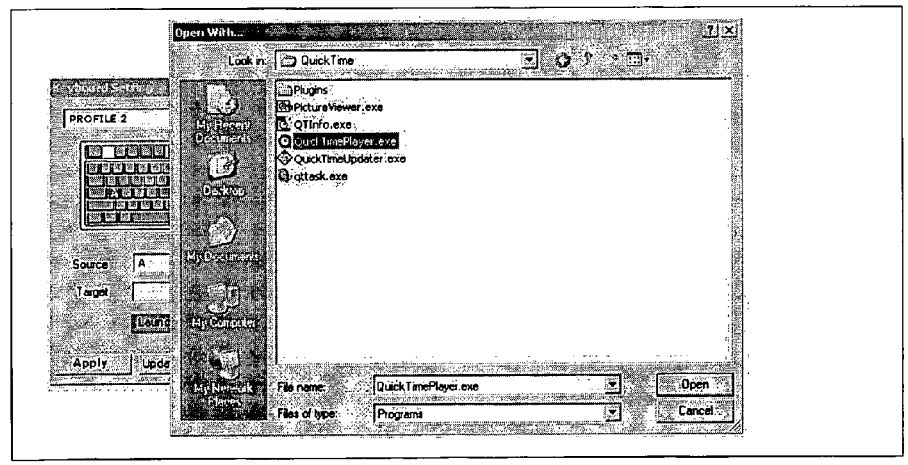
FIG. 10 shows a window whereby the user may define how the associated program to be launched should be opened (e.g., which application should be utilized)

As shown in FIG. 9, in addition to a macro or shortcut, keys may be assigned to launch an executable program. In such an instance, the user may select the "Launch Program" button shown in FIG. 9, following which a new popup window may appear prompting the user to select the desired application to launch the selected program. QuickTimePlayer.exe is selected in the example shown in FIG. 10.

Figure 11:
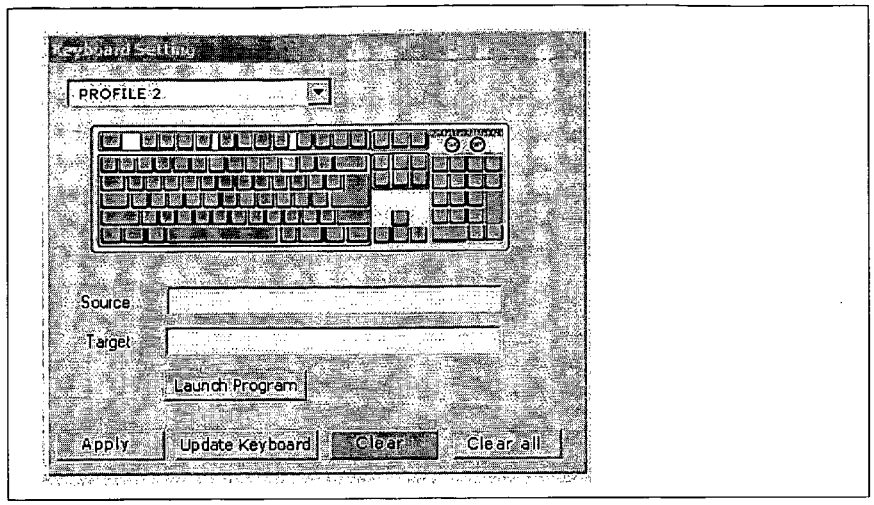
FIG. 11 illustrates how keys may be cleared of association with any macro in accordance with one embodiment of the present invention.

FIG. 11 illustrates that keys may also be cleared of their previously programmed function, whether that is a macro, launching a program or otherwise. In the exemplary software window shown in FIG. 11, after a profile and key is selected by the user as with programming, a clear button is depressed. Again, this may be saved to the hardware in the programmable device.

Figure 12:
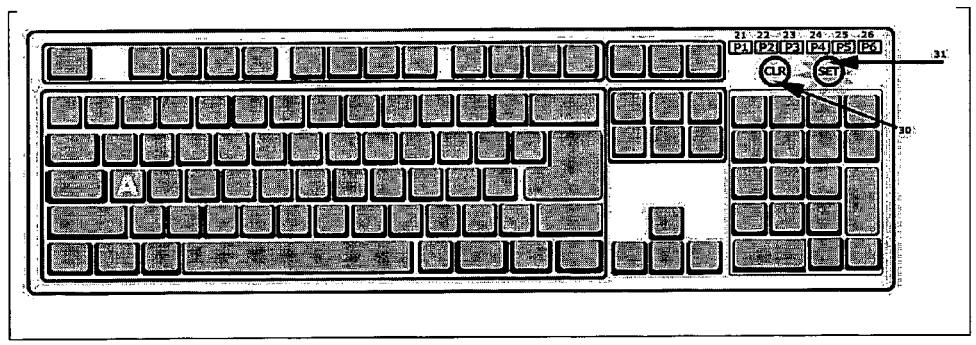
FIG. 12 illustrates how keys may be programmed in accordance with a programmable keyboard according to one aspect of the present invention.
Figure 13:
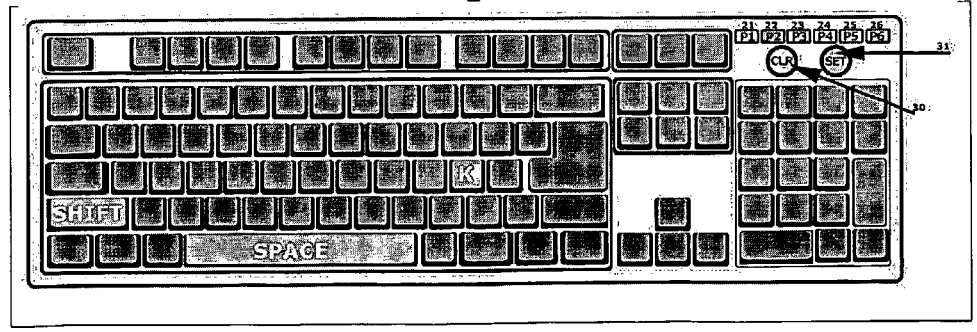
FIG. 13 illustrates the entry of a macro associated with the key selected by the user as show in FIG. 12 in accordance with a programmable keyboard according to one aspect of the present invention.

In FIG. 12, a programmable keyboard with special programming input features is disclosed. FIG. 12 depicts a series of special buttons or keys P1-P6 (shown in FIGS. 12 as 21-26) that correspond to six different profiles. Also shown in FIG. 12, are CLEAR button 30 and SET button 31. As shown in FIG. 13, with such a keyboard the user may select a user profile to modify by pressing the desired profile selection button 22, followed by the SET button 31. The SET button 31 may then begin flashing to indicate that the hardware is ready for active programming. The user may then select the desired source key, after which the indication on the SET button 31 may change, such as from flashing to a solid light. The user may then input the target macro sequence, following which the SET button 31 may dim, indicating that programming is complete. Similarly, the CLEAR button 30 may be depressed to clear various source keys from an association with a macro or other target function.

Figure 14:
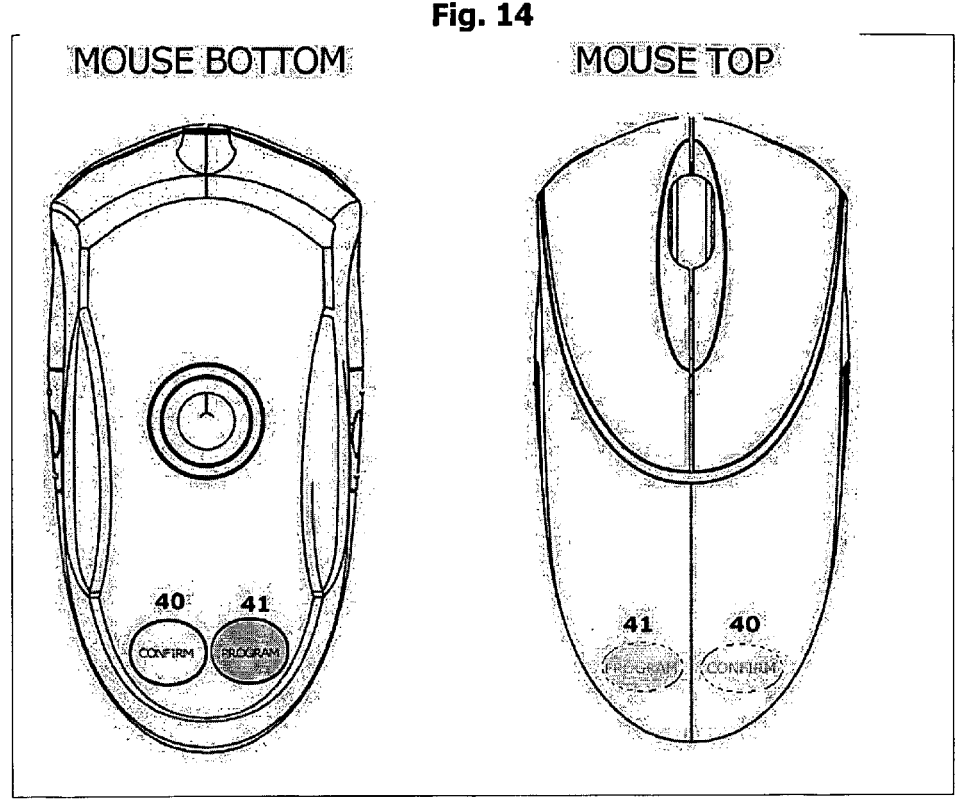
FIG. 14 shows a top and bottom view of a programmable mouse with programming features according to one aspect of the present invention.
Figure 15:
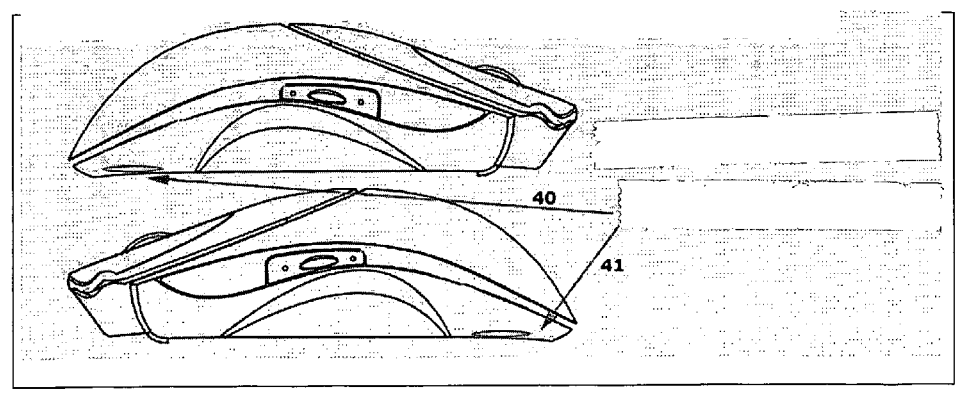
FIG. 15 shows side views of a programmable mouse with programming features according to one aspect of the present invention.

In an alternative embodiment of the present invention, a computer mouse is contemplated having similar special programming input features as those described in connection with the keyboard shown in FIG. 12. FIG. 14 depicts a computer mouse with special buttons 40 and 41 corresponding to programming and confirming. In this instance, the user may depress the "Program" button 41 on the bottom of the mouse. Next, the user can click on the source mouse button to which to bind the shortcut/macro. After inputting the desired shortcut/macro, the user can depress "Confirm" button 40 on the bottom of the mouse to complete the programming.

Figure 16:
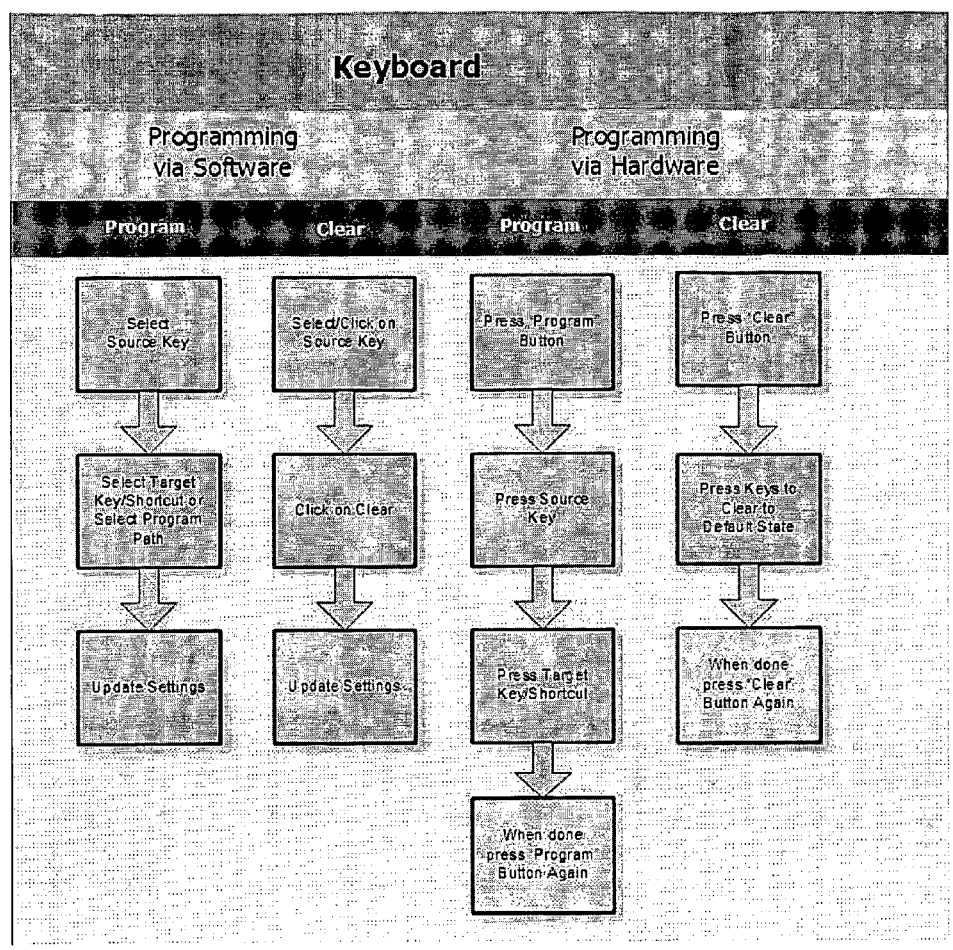
FIG. 16 is a flowchart illustrating the use of a programmable keyboard to program key inputs according to one aspect of the present invention.
Figure 17:
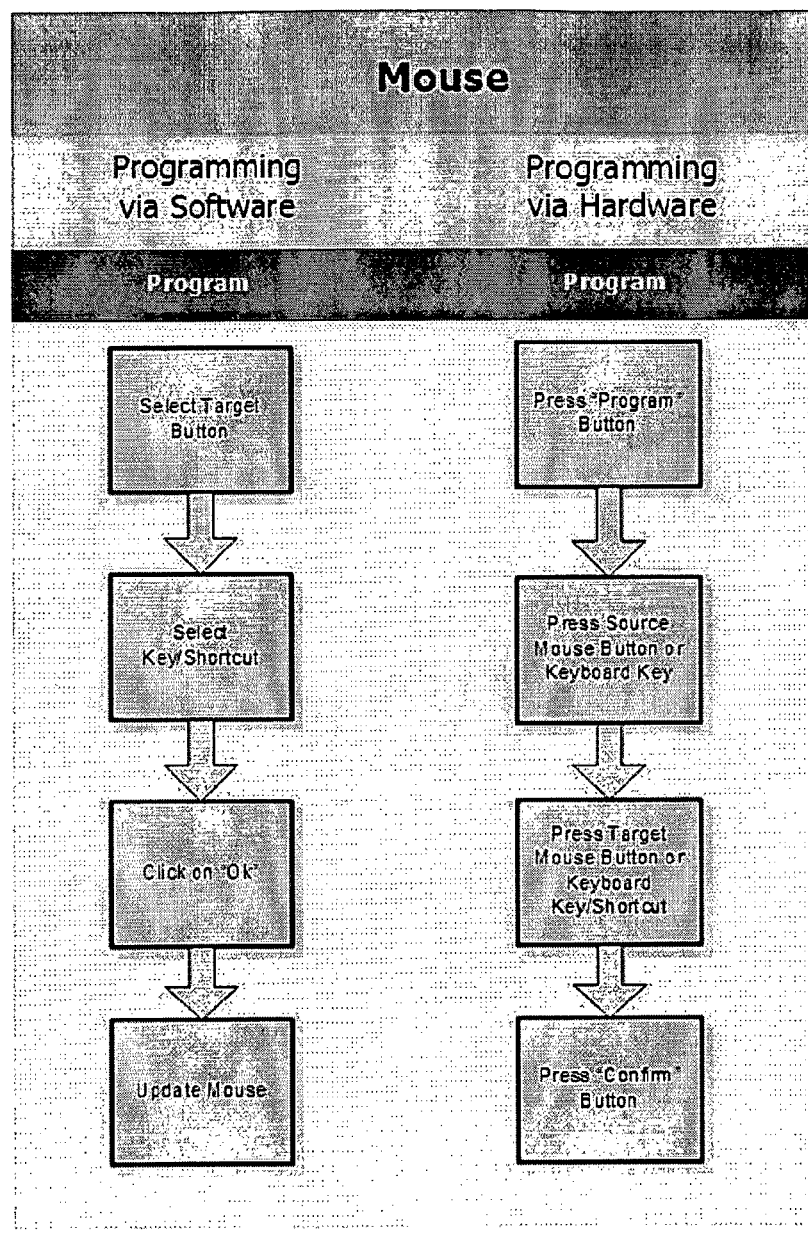
FIG. 17 is a flowchart illustrating the use of a programmable mouse to program user inputs according to another aspect of the present invention.

FIG. 16 depicts an exemplary programming flow for a programmable keyboard of the present invention. As discussed above, programming may be accomplished via software interface or hardware interface. FIG. 17 depicts an exemplary programming flow for a programmable mouse of one type contemplated by the present invention.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A programmable user input device comprising:
a microcontroller carried by the programmable user input device;
a plurality of control inputs; and
a nonvolatile memory for storing user-defined programming instructions, said user-defined programming instructions executable by the microcontroller and adapted to program at least one of the plurality of control inputs to correspond to at least one user-defined depression, the at least one user-defined depression performed on at least one other control input of the plurality of control inputs;
wherein the microcontroller is configured to program individually each of the plurality of control inputs in response to user depression of at least one of the plurality of control inputs;
wherein the microcontroller is configured to be switchable from a standard mode to a programmable mode in response to actuation of a first predefined set of the plurality of control inputs;
wherein the programming of each of the plurality of control inputs is performed when the microcontroller is in the programmable mode;
wherein the microcontroller is configured for creating and storing a plurality of user-defined profiles on the nonvolatile memory;
wherein each user-defined profile within the plurality of user-defined profiles corresponds to an assignment of at least one of the plurality of control inputs to a particular one of the plurality of control inputs; and
wherein a user-defined profile is switchable to a different user-defined profile in response to actuation of a second predefined set of the plurality of control inputs.

2. The programmable user input device of claim 1, wherein said user input device is a compiler mouse.

3. The programmable user input device of claim 1, wherein said user input device is a computer keyboard.

4. The programmable user input device of claim 1, wherein said user-defined programming instruction further comprises launching of executable file stored on the nonvolatile memory.

5. The programmable user input device of claim 1, wherein said nonvolatile memory is an EEPROM.

6. The programmable user input device of claim 1, wherein said nonvolatile memory is a modular and removable from said programmable user input device.

7. A method for programming a user input device comprising:
selecting a first user profile from a plurality of user profiles for said user input device;
actuating a first predefined set of a plurality of control inputs of the user input device to switch a microcontroller of the user input device from a standard mode to a programmable mode;
assigning user-defined programming instructions, said user-defined programming instructions adapted to program at least one of the plurality of control inputs to correspond to at least one user-defined depression, wherein the at least one user-defined depression is performed on at least one other control input of the plurality of control inputs, wherein each of the plurality of control inputs being individually programmed in response to user depression of at least one of the plurality of control inputs; and
storing said user-defined programming instructions in a nonvolatile memory;

wherein the microcontroller is configured for creating and storing the plurality of user-defined profiles on the nonvolatile memory; and wherein the first user profile is switchable to a second user profile in response to actuation of a second predefined set of the plurality of control inputs.

8. The method for programming a user input device of claim 7, wherein said selecting of the first user profile is accomplished by selecting a dedicated hardware option associated with the first user profile.

9. The method for programming a user input device of claim 7, wherein said user input device is a computer mouse.

10. The method for programming a user input device of claim 7, wherein said user input device is a computer keyboard.

11. The method for programming a user input device of claim 7, wherein said user defined programming instruction further comprises launching an executable file stored on the nonvolatile memory.

12. The method for programming a user input device of claim 11, further comprising selecting a software application stored on the nonvolatile memory of the user input device, the software application configured to launch said executable file.

13. The method for programming a user input device of claim 7, wherein said nonvolatile memory is an EEPROM.

14. The method for programming a user input device of claim 7, wherein said nonvolatile memory is a modular and removable from said programmable user input device.

15. A nonvolatile memory including a program of instructions, wherein the program of instructions upon being executed by a microcontroller on a computer input device causes the computer input device to:

select, via a user interface of the computer input device, of a first user profile from a plurality of user profiles stored on the nonvolatile memory of the computer input device;

generate user-defined programming instructions, the said user-defined programming instructions adapted to program at least one of a plurality of control inputs to correspond to at least one user-defined depression, wherein the at least one user-defined depression is performed on at least one other control input of the plurality of control inputs, wherein each of the plurality of control inputs being individually programmable in response to user depression of at least one of the plurality of control inputs; and communicate the user-defined programming instructions via a data communication module to the nonvolatile memory of the computer input device for storage therein;

facilitate switching the microcontroller from a standard mode to a programmable mode in response to actuation of a first predefined set of the plurality, of control inputs, wherein the programming of each of the plurality of control inputs is performed when the microcontroller is in the programmable mode; and facilitate switching from the first user profile to a second user profile in response to actuation of a second predefined set of the plurality of control inputs.

16. The nonvolatile memory of claim 15, wherein the program of instructions when executed further enables a user to selectively clear at least a portion of said user-defined programming instructions.

17. The nonvolatile memory of claim 15, wherein said computer input device is a computer mouse.

18. The nonvolatile memory of claim 15, wherein said computer input device is a computer keyboard.

19. The nonvolatile memory of claim 15, wherein said user-defined programming instruction comprises launching an executable tile stored within the nonvolatile memory.

20. The nonvolatile memory of claim 19, wherein executing of the programming instructions enables identification of a software application stored on the nonvolatile memory with which to launch the executable file.

21. The nonvolatile memory of claim 15, wherein said nonvolatile memory is an EEPROM.

22. The nonvolatile memory of claim 15, wherein said nonvolatile memory is modular and removable from said computer input device.

* * * * *